April 17, 1934.  G. A. M. LAMBLIN-PARENT  1,955,602
LIGHT PROJECTOR
Original Filed Dec. 11, 1929  2 Sheets-Sheet 1
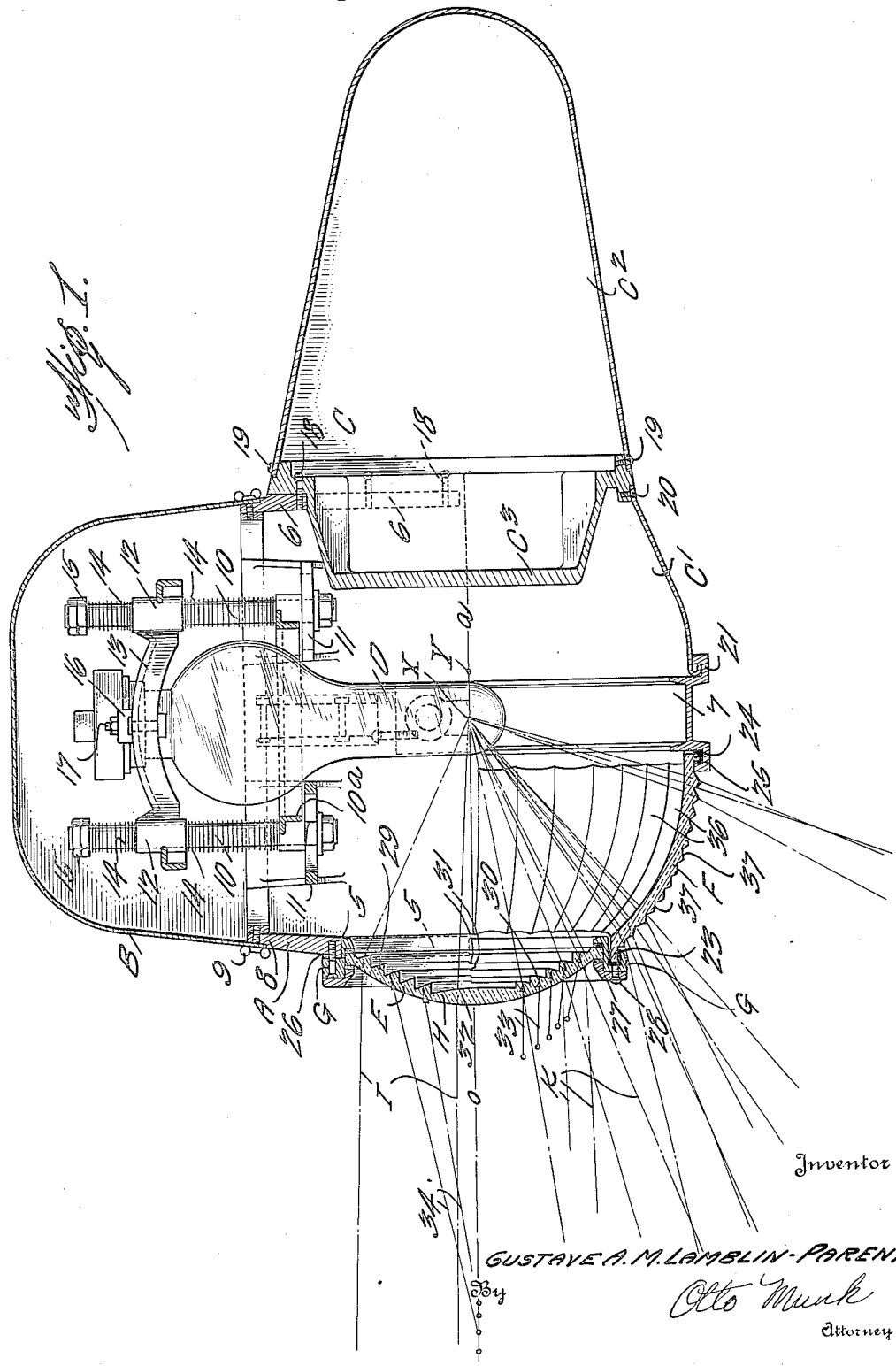
Inventor
GUSTAVE A. M. LAMBLIN-PARENT
By Otto Munk
Attorney

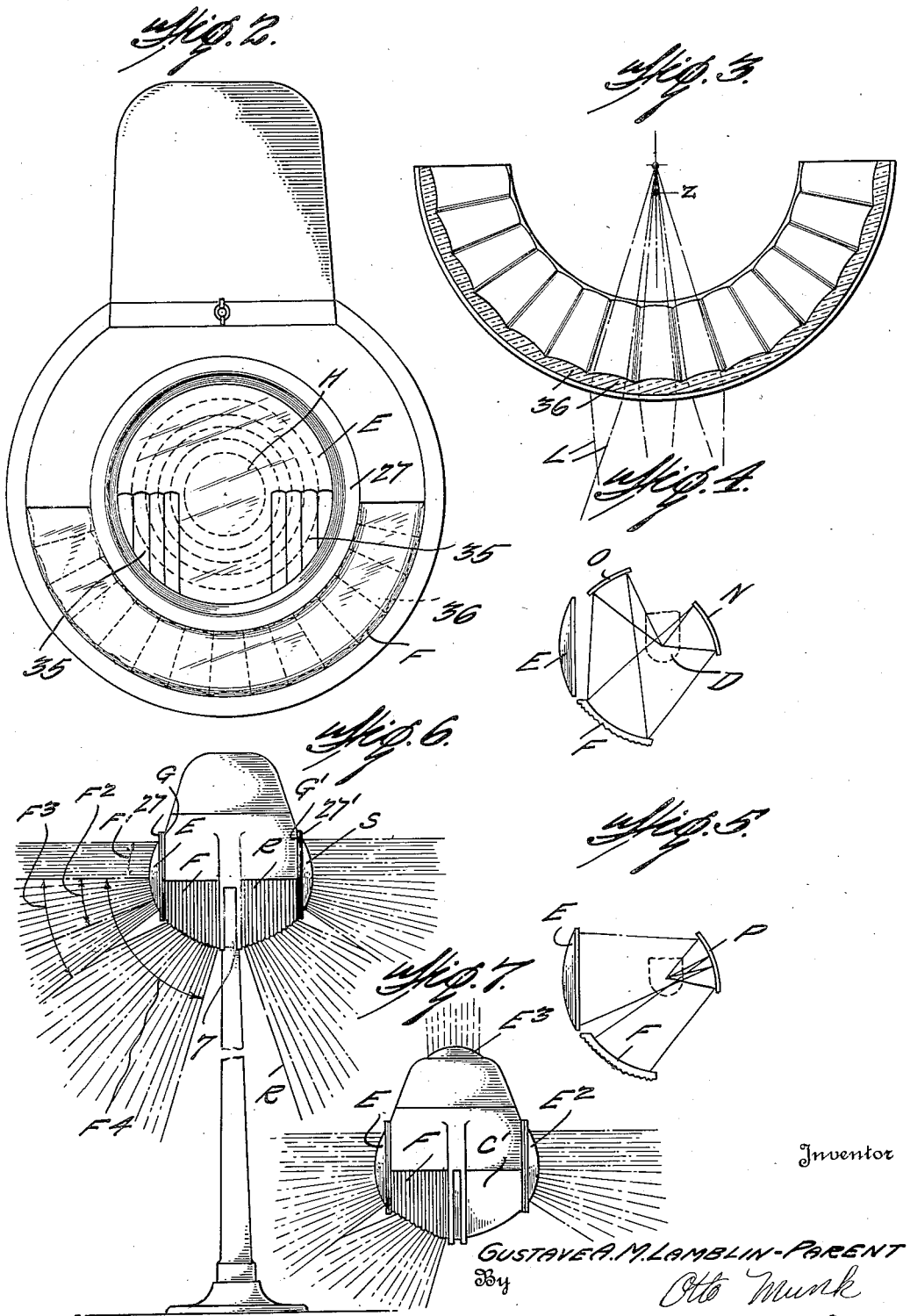

Patented Apr. 17, 1934

1,955,602

UNITED STATES PATENT OFFICE 1,955,602

LIGHT PROJECTOR

Gustave Alphonse Marie Lamblin-Parent, Ronchin, France, assignor, by mesne assignments, to United States Holding Corporation, a corporation of Delaware Application December 11, 1929, Serial No. 413,361
Renewed June 29, 1933. In France December 11, 1928

26 Claims. (Cl. 240—7.7)

This invention relates to an improvement in vehicle headlights, and more particularly to one adapted for aeroplane use as well as the lighting of platforms, streets, highway and other areas.

Aeroplane lights heretofore used have commonly employed relatively narrow long range beams which do not light the region below the aeroplane, but only objects in front of or slightly below the line of flight, and the direction of the beam is controlled by the control of direction of flight, and hence the pilot cannot observe the ground on which he is about to land, and is thus obliged to locate possible obstacles by various movements of the plane to direct the light in the desired directions. This inability to observe the ground beneath the plane is of particular disadvantage when an aeroplane is obliged to make a sudden landing, or comes down in a tail-spin. Further, in the lights heretofore in use, distant obstacles such as rows of trees and the like which may hinder the landing of the aeroplane are observable when the aeroplane is near the earth only when the plane is travelling substantially parallel with the ground, and cannot be seen if the aeroplane materially deviates from such relative position.

The present invention has for its particular object to provide a light projector which, when used on an aeroplane, not only is enabled to illuminate distance obstacles, but also illuminates a wide area directly beneath the plane and extending clear to the distant illumination, and in carrying out this object, I provide a projector having an optical system, by which a beam of light is projected which includes a central section substantially parallel to the optical axis, for distant illumination, divergent sections situated below the axis and which illuminate intermediate areas, and a third section lower than the divergent sections, and which illuminates a wide area beneath the plane, the various sections of the beam over-lapping and merging into each other, and providing in all, a composite beam which illuminates an adequate area for observation by the pilot even though the plane be descending in unorthodox manner.

A further object of the invention is to provide a projector involving features of convertibility, whereby it may be utilized for purposes other than use on aeroplanes.

With these and other objects in view, as will become apparent as the description proceeds, the invention resides in the construction, combination and arrangement of parts hereinafter more fully described and claimed.

In the drawings,—

Figure 1 presents a vertical section taken through an aeroplane light projector, in accordance with the invention.

Figure 2 represents a front view thereof.

Figure 3 represents a vertical transverse view through the lens of semi-circular spherical segmental form.

Figures 4 and 5 are diagrammatic illustrations of modifications.

Figure 6 represents a diagrammatic side elevation of the projector as used in railroad platform lighting.

Figure 7 represents a similar view of the projector used in ship lighting.

Referring more particularly to the drawings, the projector includes a casing A, having a removable cover B, and a removable rear section C, such casing having semi-annular ring or segment portions 5 and 6 at its front and rear respectively, and intermediate these portions a semi-annular ring or segment 7, the segment portions 5 and 6 being arranged above the axis of the projector, and the segment 7 extending below the same.

The cover B is dome-shaped, and substantially rectangular in horizontal section, and fits over the shouldered upper flanged portion 8 of the casing, being removably held thereon by wing screws 9, or other suitable means.

Within the cover is housed the mount for the lamp D. This mount includes a plurality of posts 10, arranged in rectangular fashion, and passing at their lower ends through the corner sleeves of a rectangular frame 10ª and through slots in the ears 11, which ears may be cast with the housing A. Nuts mounted on the lower ends of the posts co-operate with the springs 14 in keeping the lamp mount adjusted in proper position on the ears 11. The guides 12 of a rectangular lamp-carrier 13 on which the lamp is supported are slidable on the posts, and the springs 14 arranged on the posts 10 above and below the lamp-carrier guides are adjusted to the proper tension by nuts 15 for properly locating the lamp filament with respect to the optical system. The lamp is carried in a cross arm 16 detachably secured by bolts 17, or otherwise to the lamp-carrier 13. The mounting of the lamp is sufficiently resilient to take up the vibration incident to its use, and through the proper adjustment of the springs, the filament of the lamp can be nicely adjusted with reference to the optical system of the projector.

The rear section C includes a substantially semi-circular conic section c', the rear dome-shaped cover $c^2$, and the rear cover mounting $c^3$. The latter may be removably secured to the segment 6 by screws or other fastenings 18 and the rear cover section attached to the shouldered rear flange of the cover mounting by screws or the like 19, and the forward flange of the cover mounting may be fastened to the section $c'$ by the screws 20. This section at its forward edge, below the axis is flanged over and detachably engages in the channeled rear flange 21 of the central semi-ring or segment 7. It will be understood that the rear section, including the conic section $c'$, the cover mounting $c^3$ and the rear cover $c^2$ may be bodily removed from the lamp casing, and further, that if desired, the rear cover $c^2$ and its cover mounting $c^3$ only may be removed, leaving the conic section $c'$ in place, the purpose of which will later appear in connection with the convertible features of the lamp.

Mounted in the forward end of the lamp is a lens E of a general circular Fresnel type, and between this lens and the central segment 7 of the lamp housing is mounted a lens F of a general semi-circular spherical segmental form. The lens E is centered substantially on the optical axis $o$—$a$ of the projector, and the lens F as illustrated is arranged substantially coaxially with the upper lens at its upper edges lies substantially in the horizontal plane of such axis, and is otherwise arranged therebelow, the front and rear edges of the lens F lying substantially in parallel planes transverse to the axis, the forward edge being of semi-circular shape, and of smaller diameter than the rear edge. The lens E is mounted in a ring G, the lower half of which is channeled and receives the forwardly extending flange 23 of the lens F, the rear radially extending flange 24 of which is received in the channeled flange 25 of the central casing segment 7. Suitable packings for the lenses are provided as shown. The ring G is secured to the semi-circular ring or segment 5 by screws 26, and a retaining ring 27 for the lens E is secured to the ring G by the screws 28 or the like.

The lens E has a spherical front face H, and is provided on the upper half of its rear face with a series of substantially semi-circular refracting zones 29 and on its lower half another series of substantially semi-circular refracting zones 30, the latter being continuous at their outer edges with the outer edges of the upper zones, and being toward their inner edges of decreasing thickness with respect to the upper zones, a series of substantially horizontally arranged abrupt shoulders 31, extending substantially diametrically of the lens, separating the upper and lower zone. Arranged centrally of the lens is a bulleye, 32, the lower half of which is of different curvature than the upper half increasing in thickness toward its outer edges with respect to the upper half, and across which the shoulders extend. The zones 29 in the upper half of the lens, and the bull's eye, have a common principal focal region at X, and the lower zones 30 and lower half of the bullseye have a principal focal region at Y, the zones 30 being of cylindrical curvature radially of the lens and being struck from centers arranged at decreasing distances below the optical axis and with decreasing radii, as indicated at 33, the upper zones being struck with increasing radii along the optical axis, as indicated at 34. On the lower half of the front face of the lens and on opposite sides of the central portion thereof are arranged the series of vertical cylindrical flutes 35. The lens F on its inner face is provided with a series of longitudinally extending convex flutes 36 which decrease in width towards the forward edge of the lens, and these flutes with the outer face of the lens form a series of double convex lenses as seen in Figure 3. They have a principal focal region at Z, below the optical axis but close to and therefore substantially coincident with one of the focal regions of the front lens E (Fig. 3, see also Fig. 1 illustrating the light distribution). The lens F may have its outer face provided with a series of circumferential semi-annular refracting zones, whose refracting faces 37 in sections axially of the lens increase in angular relationship with the lens axis as the rear edge of the lens is approached.

With the optical elements arranged as described, and with the light source at the principal focal region X, the upper half of the lens E will project a section of the entire beam, composed of parallel rays such as I, which serve to penetrate to a distance and illuminate the landing field or other area, or obstacles, at a distance from the projector, while the lower portion of the lens E projects a section of the beam, the rays of which from substantial parallelism adjacent the axis, diverge or spread as the outer edges of the lens are approached. The rays passing through the vertical flutes 35 are spread laterally, and the rays passing through the zones 30 cross each other, with the sections of the beam projected by such zones overlapping the sections projected by adjacent zones, as indicated by the rays K. The rays of light projected through the lens F are crossed by the flutes 36, as indicated by the rays L, Fig. 3, with the light passing through one flute over-lapping (after crossing) that passing through adjacent flutes, and as indicated in Figure 1, such rays are, by the refracting zones 37 spread longitudinally of the lens in such a manner that the light projected by the forward edge of the lens F overlaps that projected by the outer edges of the lens E, as indicated. The crossing and spreading of the rays by the lower portions of the lens E, and by the lens F, results in substantial uniformity of the light projected through these portions, the intensity of such light, however, decreasing from the optical axis outwardly. The entire beam, in vertical section longitudinally of the axis covers substantially 90°, extending substantially vertically downwardly at its rear edge, and being substantially horizontal at its upper edge, and in vertical section transversely of the axis and below the same covering substantially 180° for the portions of the beam projected by the lower half of the lens E and the lens F. Thus not only are regions in front of and at a distance from the projector lighted, but also regions intermediate the projector and the distant regions, as well as regions directly beneath and to the sides and forward of the projector.

The composite beam projected is indicated diagrammatically in Figure 6, comprising the following elements,—

1. A section $F^1$ of parallel rays projected by the upper part of the circular Fresnel lens and lighting the distant regions, so that when used as an aeroplane projector, the pilot, during the whole of the landing operation, may observe distant obstacles to be avoided in making his landing.

2. A centrally located downwardly spreading section $F^2$, the angle of vertical spread of which, for instance, may be 15°, this section of the beam proceeding from the lower central portion of the lens between the series of vertical cylindrical flutes.

3. Divergent sections which lie on each side of the section $F^2$, designated $F^3$, and which may be of greater angle of spread, such sections proceeding from the portions of the lens covered by the series of vertical flutes.

The divergent beam sections $F^2$ and $F^3$ co-operate to light the normal landing region of the aeroplane, and widen the area illuminated by the beam section $F^1$, although being of less intensity than such section, and the diverging beam sections $F^3$ light up regions on both sides of the regions illuminated by the sections $F^1$ and $F^2$, so as to light the outer sides of the landing region.

4. The beam section $F^4$, which is substantially in the neighborhood of 75° in vertical spread, and which proceeds from the lens F and the lower portion of the lens E and sufficiently lights the region below the aeroplane and forwardly and to the sides thereof, so that the pilot can always observe his landing ground, even if under conditions which are unfavorable for landing, as for instance, as when the aeroplane is descending in tail-spin fashion.

The projector may be disposed at a number of points on an aeroplane, and if situated near the center may be positioned at a point such that the optical axis is slightly below the sweep of the propeller, and if so positioned, since none of the rays diverge above the axis of the projector, no rays will strike the propeller blades, and no effect of back-lighting by the reflection of rays by the propeller will be produced, so that the pilot will not be subject to any glaring light.

In the diagrammatic illustration in Figure 4, I have shown an arrangement whereby mirrors are employed to increase the light passing through the lens F, the mirror N being arranged to the rear of the lamp D, the mirror O in front thereof, both mirrors projecting light from the light source through the lens F. Again, in the diagrammatic arrangement shown in Figure 5, a single mirror P, arranged to the rear of the light source projects light partially through the lens E, and partially through the lens F. While the use of mirrors is not necessary, it may be found advantageous in increasing the illuminating qualities of the projector.

The projector may also be used, in a modified form, in lighting the platforms of railway stations or other areas such as streets, highways, etc. where it is desired to project light in both directions from the position of the projector as well as downwardly and to the sides thereof, and in this form of the invention, illustrated in Figures 6, I remove the rear section C composed of the conic section $c'$, the dome-shaped section $c^2$ and cover mounting $c^3$, and substitute a lens R, similar to the lens F for the conic section $c'$, and a lens S similar to the lens E for the cover mount $c^3$. Rings G' and 27', similar to the rings G and 27, respectively, are connected with the rear segment, and co-operate with the center segment 7 in supporting these lenses in position. In this form of the invention, as will be seen, the light will be projected from both ends of the projector along the trackways, streets or highways, and the areas beneath and to the sides of the projector as well, will be illuminated.

The projector is also adapted for the illumination of ships, and in this instance, may be used in the condition of Fig. 6, or may be modified by removing only the rear cover section $c^2$ and its mounting $c^3$, substituting therefor a lens or colored glass $E^2$ (Fig. 7), and by substituting for the cover B a similar cover having mounted therein a glass or lens $E^3$. In this use of the invention, beams will be projected through the glass $E^2$ and $E^3$ which will indicate to other vessels the position of the vessel carrying the projector, and the section of the beam of light projected by the upper half of the front lens E, and by the lower half thereof, and the lens F, will illuminate the area to the front of and around the sides of the ship. In this use of the invention, three projectors may be used if desired, one on each side of the vessel and one in the middle, either at the bow or further back above decks, and the strong illumination provided will not only light up the vessel and surrounding waters in clear weather, but will, in thick weather, pierce the fog to a considerable distance, thus aiding in preventing collisions and enabling the master to know his vessel's position.

The foregoing detailed description of the invention has been given for illustrative purposes, but no undue limitations should be deduced therefrom, such changes in the construction, combination and arrangement of parts being permissible as do not depart from the spirit of the invention and the scope of the appended claims.

Having thus described my invention what I claim as new and desire to secure by Letters Patent is:—

1. A vehicle light projector including a casing having semi-circular front and rear segments arranged above the axis of the projector, and an intermediate semi-circular segment extending below the axis, a ring supported by the front segment, a front lens supported in the ring in vertical position, a lower lens of general spherical segmental form supported at its forward edge by the said ring and at its rear edge by said intermediate segment, a lamp mounted in the casing above the intermediate segment, and a rear section removably carried by the rear segment and intermediate segment.

2. A light projector including a casing having a segment arranged above the axis of the projector, and spaced therefrom, a lower segment arranged below the axis, a ring carried by the first said segment, a lens mounted in such ring, a lower lens carried at its forward edge by the said ring and at its rear edge by the said lower segment, a lamp mounting in the casing above the lower segment adapted to support a lamp, and a removable cover arranged above the lamp mounting.

3. A light projector including a lens having on its rear face circular stepped refracting zones and a centrally located bullseye, the zones in the upper half of the lens having a common principal focal point on the axis of the projector and the zones of the lower half of the lens having a different common principal focal point and being of different curvature than the upper zones, a line of abrupt shoulders extending substantially horizontally and diametrically of the lens across the zones thereof, a lower lens of substantially semi-circular spherical segmental form having its forward edge substantially contiguous with the lower edge of the first said lens and being of increasing diameter toward its rear edge and having longitudinally extending cylindrical flutes of decreasing width forwardly, such flutes having a principal focal point below the axis of the projector, and a light source arranged at the principal focal region of the zones in the upper half of the first said lens.

4. In a light projector, the combination of a forward lens having substantially circular stepped refracting zones on its rear face, and a series of vertical flutes on its forward face, the zones in the upper and lower halves of the lens being of different curvature and having respectively common principal focal regions, such focal regions being spaced apart on the axis of the upper lens, a lower lens of substantially semi-circular spherical segmental form having its forward edge substantially contiguous with the lower edge of the first lens and being of increasing diameter towards its rear edge and having longitudinally extending cylindrical flutes of decreasing width forwardly, such flutes having a principal focal region below the axis of the projector, said lower lens beings provided transversely of the optical axis with refracting zones whose refracting faces increase in angular relation with the optical axis towards the rear edge of the said lens, and a light source arranged at the principal focal region of the upper zones of said forward lens.

5. In a light projector, the combination of an upper lens having different principal focal regions for its upper and lower halves, such lens being provided with upper and lower refracting zones, the lower zones being of different curvature from the upper zones, a substantially semi-circular spherical segmental lower lens having its forward edge substantially contiguous with the edge of the lower half of the upper lens and having on one face longitudinally extending cylindrical flutes of decreasing width forwardly, such flutes having a principal focal region lower than the principal focal regions of the upper lens, and on its other face transversely extending refracting faces of differing angles, and a light source arranged substantially at one of said focal regions.

6. In a light projector, the combination of an substantially circular upper lens having refractive zones of different curvature on its upper and lower halves and series of vertically arranged cylindrical flutes on opposite sides of the central portion of its lower half, a lower lens of spherical segmental form having its forward edge substantially contiguous with the lower edges of the upper lens and having longitudinally extending cylindrical flutes and transversely extending refracting zones of differing angles, and a light source arranged substantially at the principal focal point of the upper half of the upper lens.

7. In a light projector, the combination of an upper lens having upper and lower refracting zones, the zones of the lower half differing in curvature from those of the upper half and differing in curvature from each other, a lower lens of substantially spherical segmental form arranged substantially coaxially with the upper lens and provided on one face with longitudinally extending flutes forming with the opposite face double convex lenses, the upper zones of the upper lens, lower zones thereof and said double convex lenses respectively having common principal focal regions, and a light source arranged substantially at one of said principal focal regions.

8. In a light projector, in combination with a casing, a front lens, a lower lens of substantially semi-annular form arranged with its forward edge substantially contiguous with the edge of the lower half of the front lens, both said lenses being detachably held by the casing, said lower lens being provided with a series of circumferential refracting zones whose refracting faces in section axially of the lens increase in angular relationship with the lens axis as the rear edge of the lens is approached.

9. A light projector comprising a casing having a forward segment arranged above the axis of the projector and an intermediate segment extending below the axis, a forward lens carried by the forward segment, a lower lens interposed between the forward lens and the intermediate segment, and a rear section tapering away from the intermediate segment.

10. A light projector comprising a casing having a forward segment arranged above the axis of the projector, an intermediate segment extending below the axis, a ring supported by the forward segment, a front lens carried by the ring, a lower lens of substantially semi-annular form supported at its forward edge by the said ring and at its rear edge by said intermediate segment, a rear section removably carried on the casing, and a rear lens carried by said rear section.

11. In a light projector, the combination of a modified Fresnel lens having an upper section and a lower section, the lower section being formed with refracting zones differing in curvature with respect to each other, the upper section being formed with refracting zones differing in curvature with respect to each other and to the zones of the lower section, each zone being of substantially uniform refractive power, and a lens of substantially semi-circular spherical segmental form having light refracting elements thereon arranged substantially below and to the rear of said modified Fresnel lens.

12. In a light projector, the combination of a modified Fresnel lens having for its upper half a shorter focal length than for its lower half, with their two focal regions spaced apart horizontally, said lens being provided with curved refracting zones, the curvature of the zones of each half varying among themselves, a substantially semi-circular spherical lower lens having a focal region and arranged substantially coaxially with said modified Fresnel lens, and a light source positioned substantially in a focal region of the first said lens.

13. In a light projector, in combination, a front lens of modified Fresnel form having on its upper and lower sections refracting zones of different refractive power and of different focal lengths, and a lower lens provided with a series of circumferential refracting zones whose refracting faces in sections axially of the lens increase in angular relationship with the lens axis as the said front lens is approached.

14. In a light projector, a modified Fresnel lens having upper and lower sections, each formed with refracting zones of different curvatures, the upper section having a focal region different from that of the lower section, in combination with a substantially semi-circular spherical lens arranged substantially coaxially with the first said lens and having a focal region, and a light source positioned in the region of the foci.

15. In a light projector, a modified Fresnel lens having an upper set of refracting zones and a lower set of curved refracting zones, the zones of the lower set varying in curvature among themselves and differing in refractive powers from the zones of the upper set, each complete zone being struck with a radius from a different center, in combination with a lens of substantially spherical segmental form disposed substantially coaxially with the first said lens.

16. In a light projector, a modified Fresnel lens having upper and lower sections each formed with refracting zones of different curvature, the upper section having a focal length differing from that of the lower section, the curvature of the zones of the one section differing from the curvature of the zones of the other section, the lens being formed with flutings for lateral light distribution, in combination with a substantially spherical segmental lens arranged substantially contiguous to the first said lens, and having light refracting elements thereon.

17. In a light projector, a modified Fresnel lens having upper and lower sets of refracting zones, the zones of the upper set varying in curvature among themselves and differing in curvature from the zones of the lower set, the zones of the lower set being struck with radii from various centers, some of which lie substantially below the axis of the lens, in combination with a substantially spherical segmental lens arranged substantially coaxially with the first said lens.

18. In a light projector, the combination of a front modified Fresnel lens having an upper portion provided with refracting zones having a focal region and a lower portion provided with refracting zones having a different focal region, and a lower lens provided with light-refracting elements thereon and having a focal region coinciding substantially with one of the focal regions of said front lens.

19. In a light projector, a front lens of modified Fresnel type having for its upper section a shorter focal length than for its lower section, in combination with a lower lens provided with light-refracting elements thereon, and a light source positioned substantially on the axis of the front lens, said lower lens having a focal region substantially at the light source.

20. In a light projector, the combination of a front lens of modified Fresnel form having a plurality of sections of different refractive powers and being of different focal lengths, and a lower lens having its forward edge substantially contiguous with the edge of the front lens and having a focal region coinciding substantially with one of the focal regions of said front lens.

21. In a light projector, the combination of a forward lens divided into upper and lower sections each formed with refracting zones of different refractive powers and focal lengths, and another lens arranged substantially opposite the said forward lens.

22. In a light projector, the combination of a front lens formed with upper and lower sections having refracting zones of varying refractive powers and different focal lengths, a lower light refracting lens arranged substantially co-axially with said front lens, and a third light refracting lens arranged substantially contiguous to said lower lens.

23. In a light projector, the combination of a front lens of modified Fresnel form having upper and lower sections of different focal lengths, a second light refracting lens substantially contiguous with the edge of the said front lens, a third light refracting lens substantially contiguous to the said second lens, and a fourth lens arranged substantially opposite the said front lens.

24. In a light projector, the combination of a front lens of modified Fresnel form having zones varying in refractive power, said zones having different focal regions, a lower lens provided with light refracting elements thereon having a focal region substantially co-incident with one of the focal regions of said front lens, and a light source placed in the region of the foci of said front lens.

25. In a light projector, a modified Fresnel lens having an upper set of refracting zones and a lower set of curved refracting zones, the zones of the lower set varying in curvature among themselves and differing in refractive powers from the zones of the upper set, each complete zone being struck with a radius from a different center, a light source, in combination with a second refracting lens substantially contiguous to said modified Fresnel lens and adapted to receive light from said source.

26. In a light projector, the combination with a front lens, of a lower lens of substantially semi-annular form arranged with its forward edge substantially contiguous with the edge of the lower half of the front lens, said lower lens being provided with a series of circumferential stepped refracting prisms.

GUSTAVE ALPHONSE MARIE
       LAMBLIN-PARENT.